US012625251B2

(12) United States Patent
Jang et al.

(10) Patent No.: US 12,625,251 B2
(45) Date of Patent: May 12, 2026

(54) METHOD AND APPARATUS FOR PERFORMING SENSING IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 676 days.

(21) Appl. No.: 17/928,810

(22) PCT Filed: Jun. 3, 2021

(86) PCT No.: PCT/KR2021/006958
§ 371 (c)(1),
(2) Date: Nov. 30, 2022

(87) PCT Pub. No.: WO2021/246807
PCT Pub. Date: Dec. 9, 2021

(65) Prior Publication Data
US 2023/0221428 A1 Jul. 13, 2023

Related U.S. Application Data

(60) Provisional application No. 63/034,994, filed on Jun. 5, 2020.

(51) Int. Cl.
*H04W 76/11* (2018.01)
*G01S 13/76* (2006.01)
(Continued)

(52) U.S. Cl.
CPC ........... *G01S 13/765* (2013.01); *H04W 76/11* (2018.02); *G01S 7/006* (2013.01); *G01S 13/003* (2013.01); *H04W 84/12* (2013.01)

(58) Field of Classification Search
CPC ...... G01S 13/765; G01S 7/006; G01S 13/003; G01S 5/00; G01S 5/02; H04W 76/11;
(Continued)

(56) References Cited

U.S. PATENT DOCUMENTS

| | | | | |
|---|---|---|---|---|
| 8,971,303 B2 * | 3/2015 | Lee | ....................... | H04W 84/12 |
| | | | | 370/338 |
| 9,350,434 B2 * | 5/2016 | Sohn | ...................... | H04W 84/12 |
| 2017/0171860 A1 * | 6/2017 | Park | .................. | H04W 72/0453 |

FOREIGN PATENT DOCUMENTS

| | | | | | |
|---|---|---|---|---|---|
| CN | 108353262 A | * | 7/2018 | ............. | H04L 47/10 |
| KR | 10-2013-0079550 A | | 7/2013 | | |

(Continued)

*Primary Examiner* — Robert W Hodge
*Assistant Examiner* — Bongani Jabulani Mashele
(74) *Attorney, Agent, or Firm* — BRYAN CAVE LEIGHTON PAISNER LLP

(57) ABSTRACT

A transmitting STA can transmit a sensing initiation frame to a first receiving STA in a wireless local area network (wireless LAN) system. The sensing initiation frame can include information related to an STA for transmitting a sounding frame and a session identifier (ID) related to an STA group that is to perform sensing. The transmitting STA can transmit the sounding frame to the first receiving STA. The transmitting STA can receive a first feedback frame for the sounding frame from the first receiving STA. The sounding frame can be a frame transmitted to identify a target. The first feedback frame can include information about a channel changed by means of the target. The sounding frame can include a null data packet announcement (NDPA) frame and a null data packet (NDP) frame.

4 Claims, 18 Drawing Sheets

———► : Sensing PPDU transmission
----► : Sensing feedback transmission

Sensing Initiator
Sensing Transmitter

STA5

STA1    STA2    STA3    STA4

Sensing Responders
Sensing Receivers

(51) Int. Cl.
    *H04W 84/12*        (2009.01)
    *G01S 7/00*         (2006.01)
    *G01S 13/00*       (2006.01)

(58) Field of Classification Search
    CPC ..... H04W 84/12; H04W 8/005; H04W 76/12;
                                        H04W 24/10
    See application file for complete search history.

(56)                References Cited

FOREIGN PATENT DOCUMENTS

| | | | | |
|---|---|---|---|---|
| KR | 10-2014-0133480 A | 11/2014 | | |
| KR | 10-2016-0035542 A | 3/2016 | | |
| KR | 10-2016-0087743 A | 7/2016 | | |
| KR | 10-2019-0011307 A | 2/2019 | | |
| WO | WO-2018187145 A1 * | 10/2018 | ............ | H04W 72/04 |

* cited by examiner (a)

(b)

———► : Sensing PPDU transmission

Sensing Initiator
Sensing Receiver

STA5

STA1          STA2          STA3          STA4

Sensing Responders
Sensing Transmitters

⟶ : Sensing PPDU transmission
----⟶ : Sensing feedback transmission

Sensing Initiator
Sensing Transmitter

STA5

STA1          STA2          STA3          STA4

Sensing Responders
Sensing Receivers

- Transmitter
- 1 omnidirectional antenna

- Receiver
- 1 Reference channel
- 1 surveillance channel

METHOD AND APPARATUS FOR PERFORMING SENSING IN WIRELESS LAN SYSTEM

CROSS-REFERENCE TO RELATED APPLICATION

This application is the National Stage filing under 35 U.S.C. 371 of International Application No. PCT/KR2021/006958, filed Jun. 3, 2021, which claims the benefit of U.S. Provisional Application No. 63/034,994, filed Jun. 5, 2020, the contents of which are all hereby incorporated by reference herein in their entirety.

TECHNICAL FIELD

The present specification relates to a sensing technique in a wireless LAN system, and more particularly, to a procedure and a signaling method for performing the sensing.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

SUMMARY

In a wireless local area network (WLAN) system according to various embodiments, a transmitting STA may transmit a sensing initiation frame to a first receiving STA. The sensing initiation frame may include a session identifier (ID) related to an STA group to perform sensing and information related to an STA transmitting a sounding frame. The transmitting STA may transmit the sounding frame to the first receiving STA. The transmitting STA may receive a first feedback frame for the sounding frame from the first receiving STA. The sounding frame may be a frame transmitted to identify a target. The first feedback frame may include information related to a channel changed by the target. The sounding frame may include a null data packet announcement (NDPA) frame and a null data packet (NDP) frame.

According to an example of the present specification, WLAN sensing may be performed by selecting STAs to participate in sensing. By defining a frame and a procedure necessary for the WLAN sensing, a specific sensing operation can be prepared. By dividing the sensing initiation frame and the sounding signal for actual sensing, control information required for the sensing and a signal used for actual sensing may be distinguished.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

Figure 1:
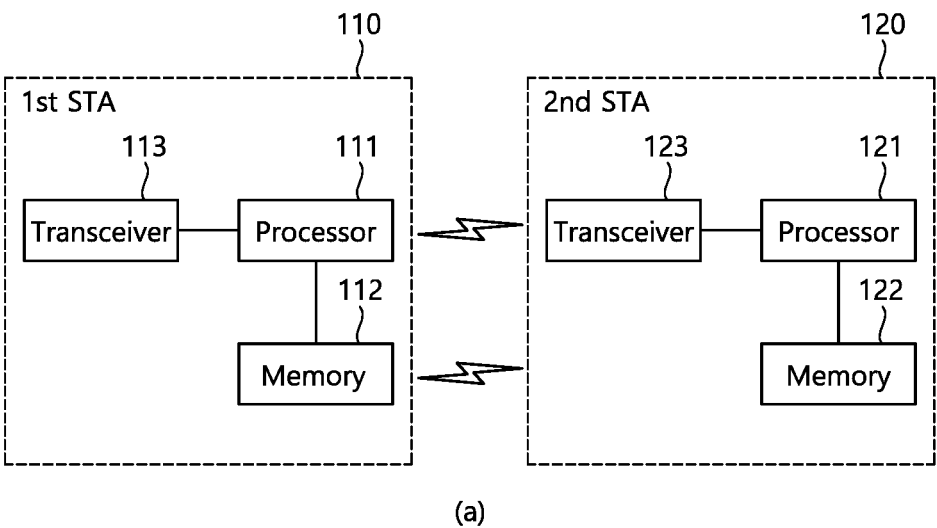
FIG. 1 illustrates an example of a transmitting apparatus and/or receiving apparatus of the present specification.
Figure 1:
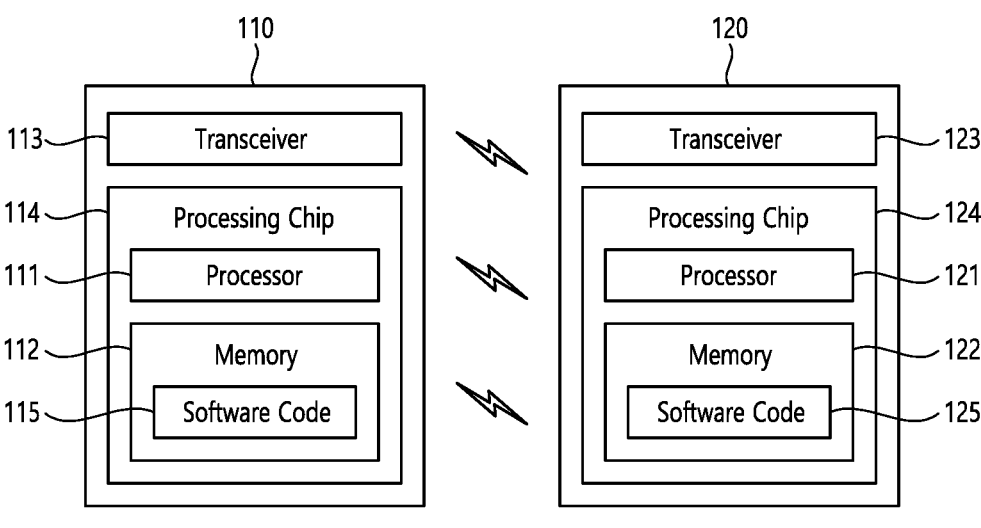

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/ receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/ configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/ parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/ receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may mean a link for communication from a non-AP STA to an AP STA, and an uplink PPDU/packet/signal or the like may be transmitted through the uplink. In addition, in the present specification, a downlink may mean a link for communication from the AP STA to the non-AP STA, and a downlink PPDU/packet/ signal or the like may be transmitted through the downlink.

A WLAN sensing technology is a sort of radar technologies which can be implemented without a standard, but it is conceived that more powerful performance can be obtained through standardization. The IEEE 802.11bf standard defines an apparatus participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus initiating sensing |
| Sensing Responder | apparatus participating in sensing |
| Sensing Transmitter | apparatus transmitting sensing PPDU |
| Sensing Receiver | apparatus receiving sensing PPDU |

Figure 2:
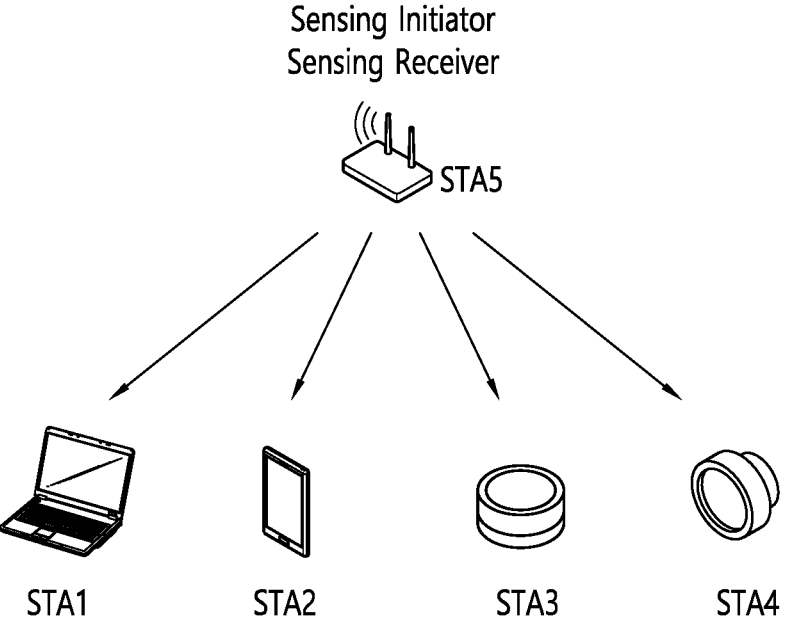
FIG. 2 illustrates an example of a WLAN sensing scenario using multiple sensing transmitting apparatuses.
Figure 3:
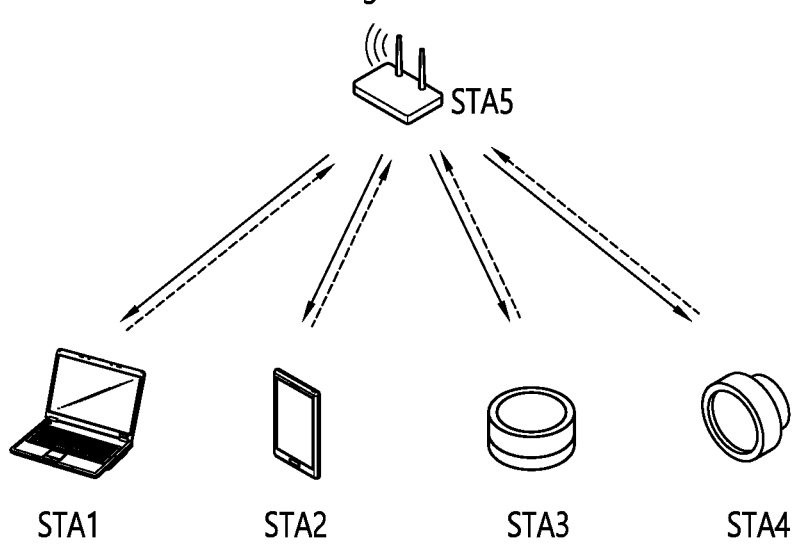
FIG. 3 illustrates an example of a WLAN sensing scenario using multiple sensing receiving apparatuses.

FIG. 2 illustrates an example of a WLAN sensing scenario using multiple sensing transmitting apparatuses. FIG. 3 illustrates an example of a WLAN sensing scenario using multiple sensing receiving apparatuses.

FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in case of FIG. 3, a procedure for transmitting (feeding back) a sensing measurement result to the sensing initiation apparatus (STA 5) is additionally required.

Figure 4:
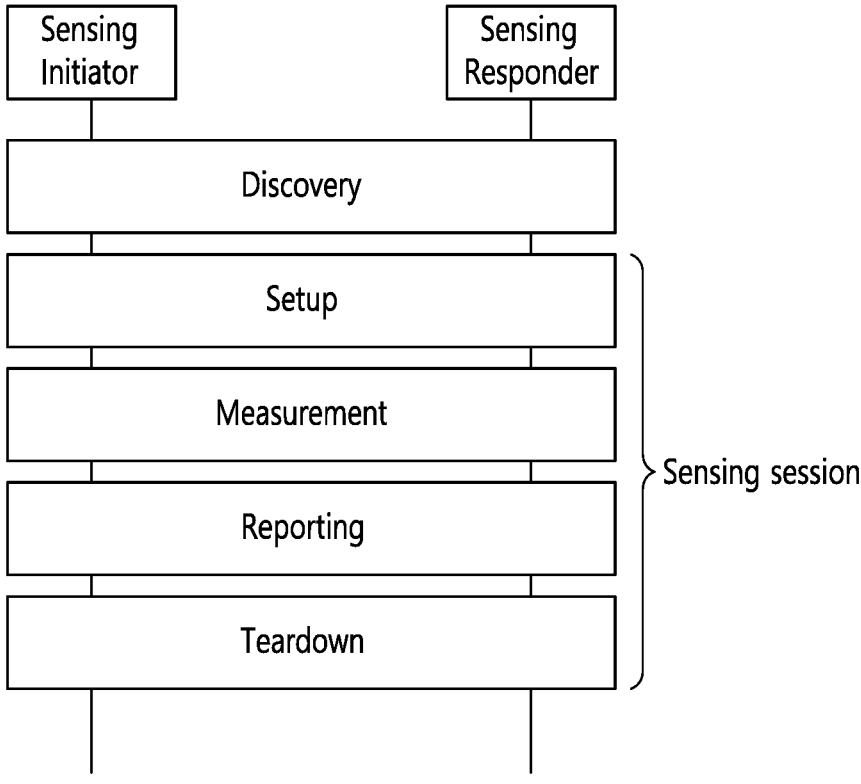
FIG. 4 illustrates an example of a WLAN sensing procedure.

FIG. 4 illustrates an example of a WLAN sensing procedure.

A procedure of WLAN sensing is performed as discovery, negotiation, measurement exchange, tear down, or the like between WLAN sensing initiation apparatus and participating apparatuses. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 5:
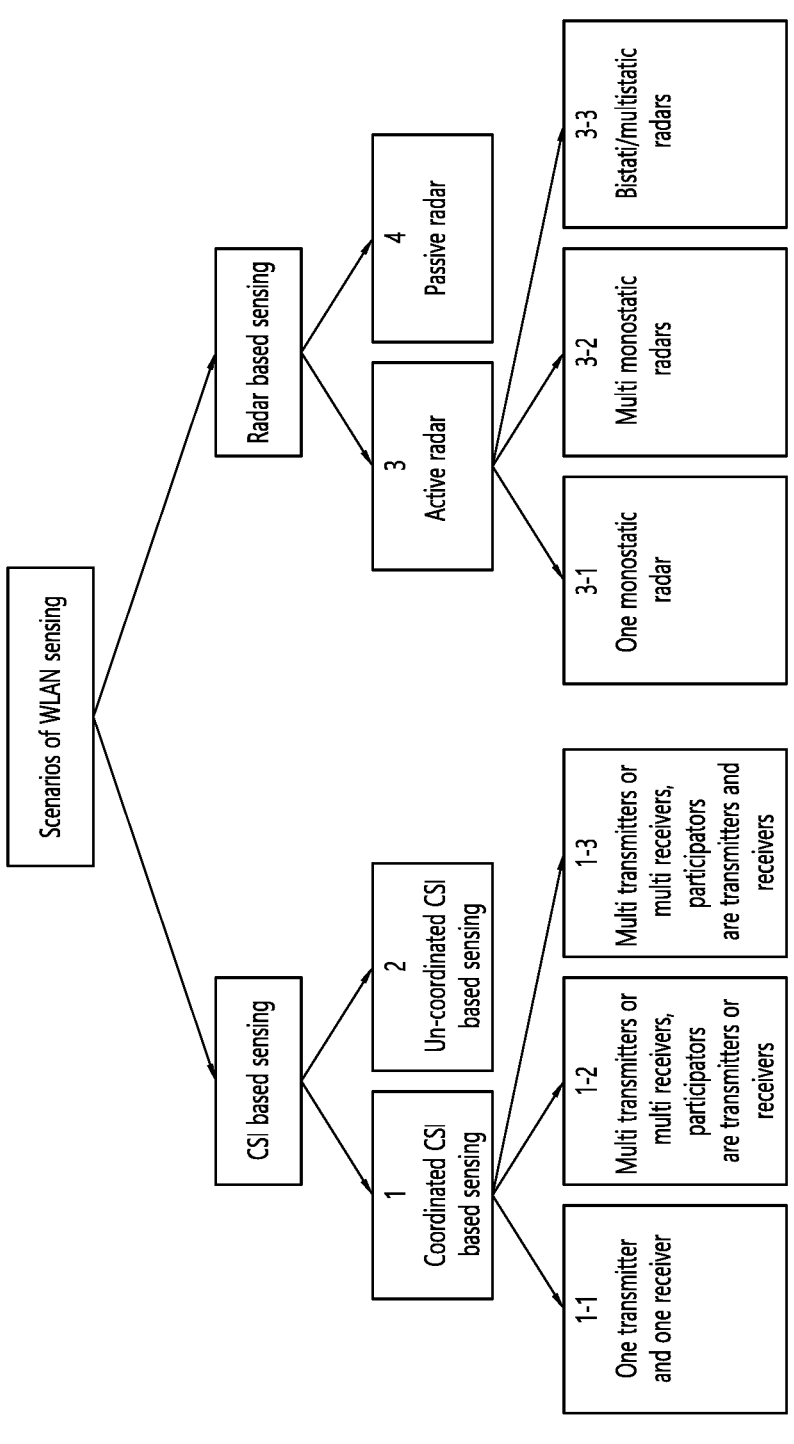
FIG. 5 is an example of classifying WLAN sensing.

FIG. 5 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
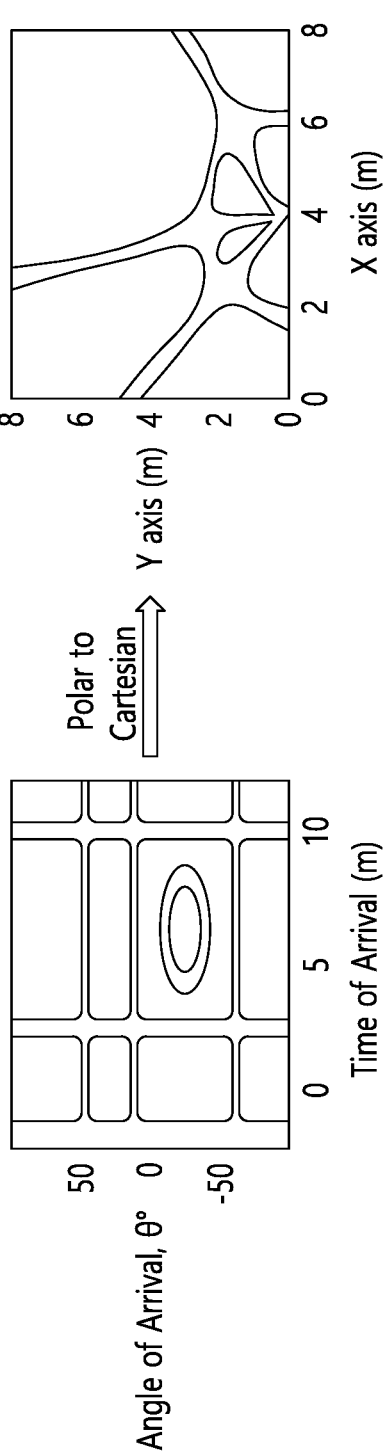
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
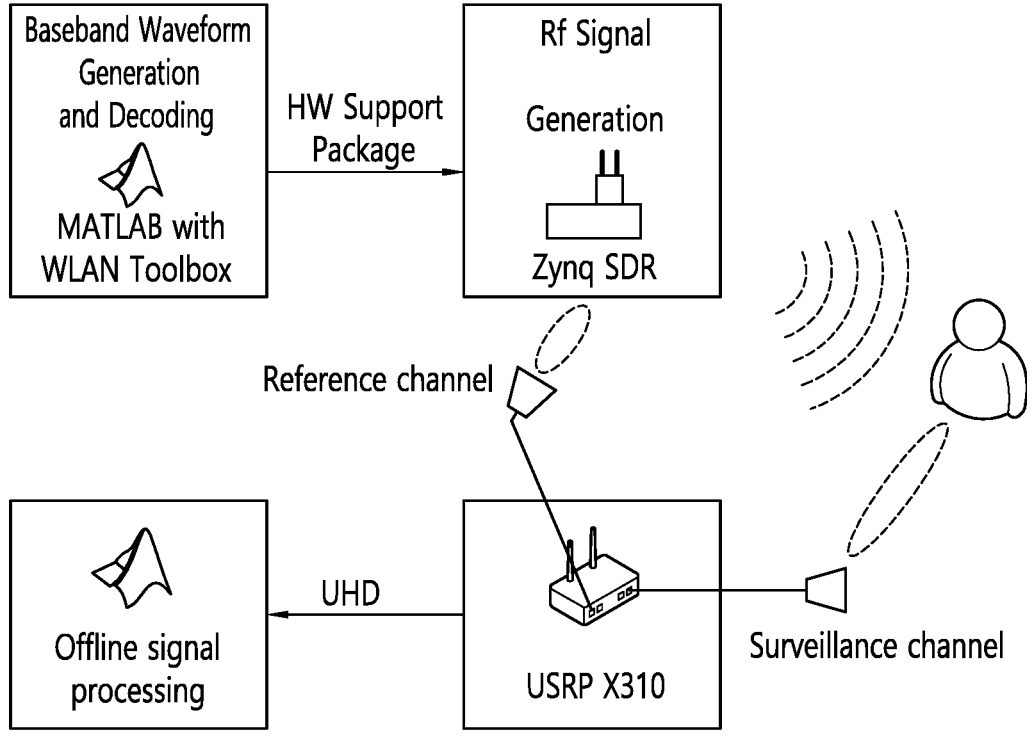
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/ gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

Figure 8:
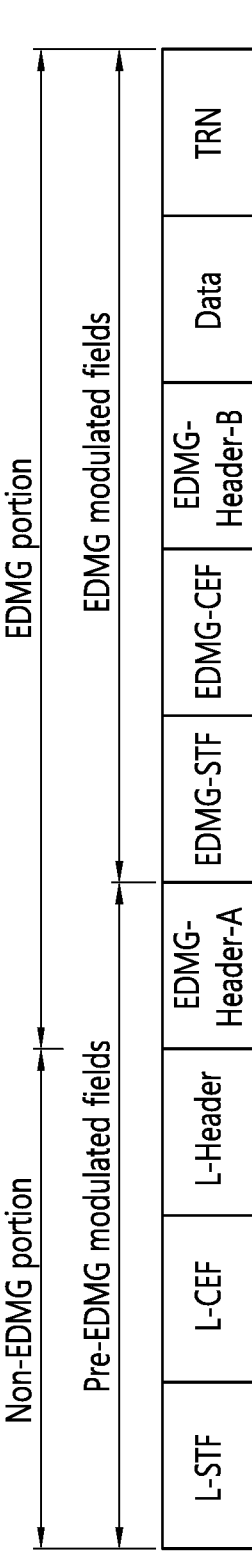
FIG. 8 briefly illustrates a PPDU structure supported in an 802.11ay WLAN system.

In IEEE 802.11, there is ongoing discussion on a technology for sensing a motion or gesture of an object (person or thing) using a Wi-Fi signal of 60 GHz (e.g., 802.11ad or 802.1 lay signal). The present specification proposes a method of configuring a frame format used for Wi-Fi sensing and a Wi-Fi sensing sequence. FIG. 8 briefly illustrates a PPDU structure supported in an 802.11ay WLAN system.

As shown in FIG. 8, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index ism of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams $i_{STS}$. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Figure 9:
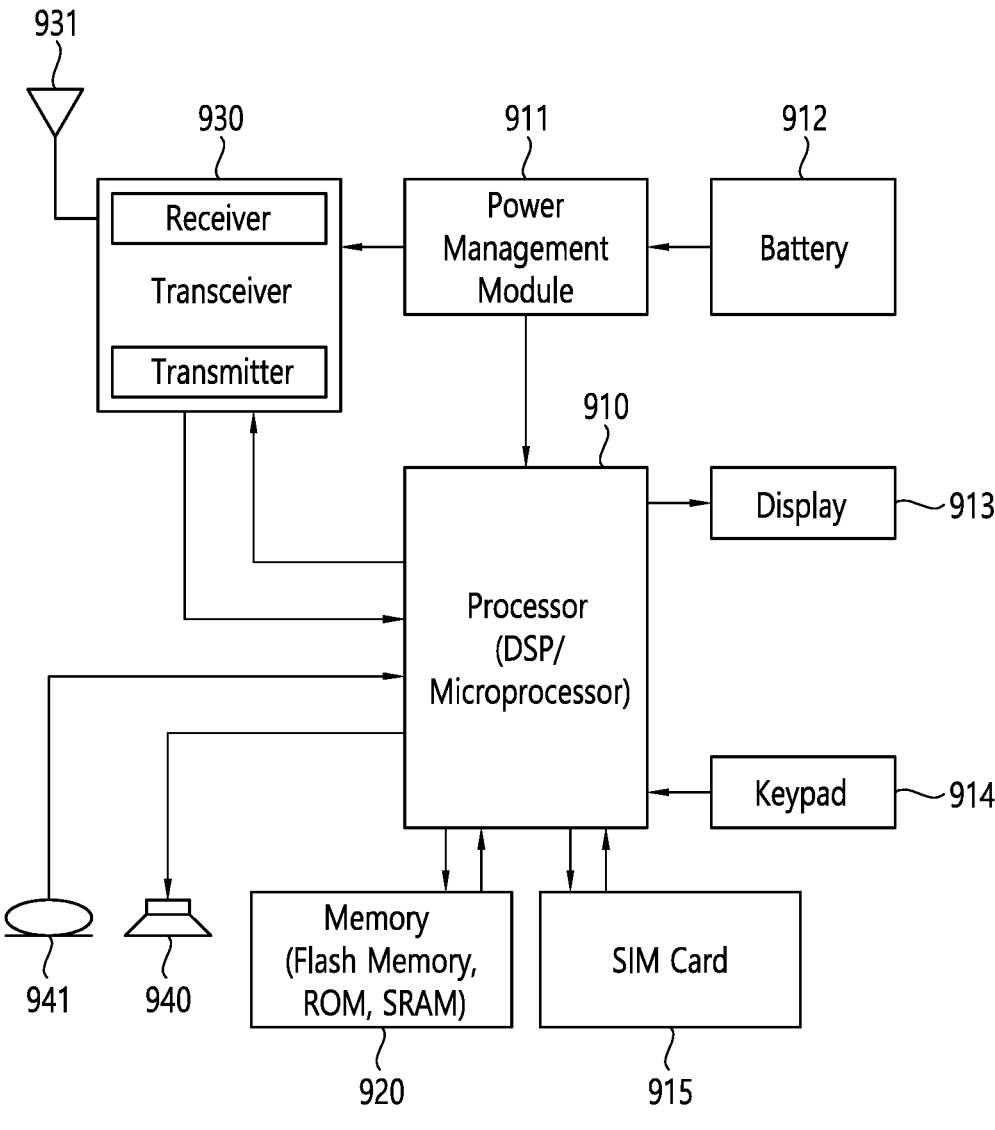
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In 11SENS, an 802.11ad and 802.11ay signal transmitting/receiving method which is a 60 GHz Wi-Fi technology is considered to sense a motion or gesture of an STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

An STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN (e.g., Wi-Fi) transmission is achieved in a broadband by using channel aggregation, channel bonding, or the like. In addition, there is ongoing discussion on WLAN transmission in a more extended broadband.

Recently, with a growing interest in a WLAN device which performs sensing by using a WLAN signal, there is ongoing discussion on this in IEEE 802.11 by organizing a study group. WLAN sensing may include various scenarios.

Figure 10:
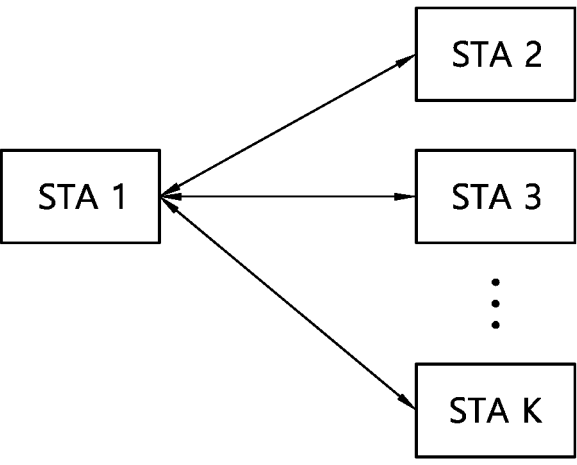
FIG. 10 illustrates an embodiment of WLAN sensing.

FIG. 10 illustrates an embodiment of WLAN sensing.

Referring to FIG. 10, a target to be sensed may be present, and STAs for performing sensing may be present. For example, an AP and an STA may perform sensing. The target may be present between the AP and the STA. For example, the AP may transmit a sensing signal to the STA, and the STA may transmit a feedback signal for the sensing signal to the AP. That is, the AP may transmit a signal to identify a sensing target, and the STA may receive a signal affected from the target and may perform measurement. The STA may transmit a measurement result to the AP, and the AP may identify the target, based on the measurement result.

WLAN sensing may include the following phases.

1) Setup Phase (Capability Negotiation)

2) Grouping Phase

3) Sensing Phase

In this specification, the sensing phase will be described. The reference (or name) in this specification may be changed, and the STA may include an AP STA or a non-AP STA. For example, the setup phase, the grouping phase, the sensing phase, etc. may be called by different names.

The sensing phase may include a step for transmitting a signal to identify a target and a step for receiving and measuring a signal passing through the target.

In the sensing phase, the STA may perform two roles.

Sensing Initiator: STA that transmits a frame that starts the sensing

Sensing Responder: STA that receives the sensing initiation frame transmitted by the initiator Sensing Initiator and Sensing Responder may transmit a signal for the sensing.

The following frame used for the sensing is defined.

Sensing Initiation: A frame that initiates the sensing for one or more sensing sessions.

For example, a sensing session can be defined as one cycle of sending and receiving from the sensing start to the final sensing result. If defined in this way, one TXOP may be an example of one sensing session. Multiple TXOPs can be one sensing session. For example, one sensing session may be the operation of the initiator transmitting the sensing initiation frame and the sounding frame and receiving the feedback frame from the responder.

Sounding: Frame for signal transmitted for target identification. A sounding frame may be composed of a combination of one or more frames. For example, the sounding frame may be a null data packet (NDP) or a combination of NDP announcement+NDP. Alternatively, a frame (e.g., a sounding frame) specialized for sensing may be newly defined. For example, a newly defined sounding frame may be used alone, or a newly defined sounding frame+NDP combination, etc., may be defined.

Feedback: A frame for reporting the result based on the received signal. That is, the feedback frame may include information on the target estimated based on the sounding frame.

Depending on the above frame and initiator/responder combination, there may be the following scenarios and frame contents.

1. When the Sensing Initiator Transmits a Sounding Frame

There may be a frame sequence as follows.

Figure 11:
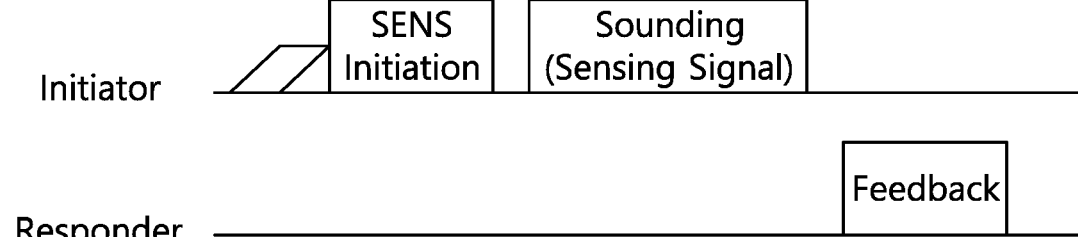
FIG. 11 is a diagram illustrating an embodiment of a method for a Sensing initiator to transmit a Sounding frame.

FIG. 11 is a diagram illustrating an embodiment of a method for a Sensing initiator to transmit a Sounding frame.

Referring to FIG. 11, the initiator may start a session through a sensing initiation frame, and the initiator may transmit a sounding frame. The responder receiving this may report required information based on the received signal.

That is, the initiator transmits a sensing initiation frame, such that a sensing session may be started. The initiator may also transmit a sounding frame after transmitting the sensing initiation frame. The responder may receive a sounding frame from the initiator and may transmit a feedback frame based on the received sounding frame. The feedback frame may include information on a target estimated based on the sounding frame.

The sensing initiation frame may have the following contents, but is not limited thereto.

Sounding frame transmitter: whether or not who will transmit the sounding frame. For example, an initiator or a responder may transmit a sounding frame. For example, information for classifying a mode in which an initiator transmits a sounding frame or a mode in which a responder transmits a sounding frame may be included. For example, only information about who transmits the sounding frame among the initiator and the responder may be included, not information related to the ID of the STA transmitting the sounding frame.

Responder (STA) information: information on STAs participating in sensing (e.g., STA ID, AID)

Group ID (GID) or Session ID: If there is a grouping for the sensing, it can be identified by transmitting the ID for this group. If only GIDs are included instead of multiple STA IDs, overhead can be reduced. Alternatively, a GID may exist for each sensing session. For example, a Session ID for a group performing sensing may be allocated for each sensing session.

Signal Length: Transmission time of the sensing signal (i.e., sounding frame). That is, length information of the sensing signal may be included.

Measurable Bandwidth: Available bandwidth for the sensing. For example, information related to a measurable bandwidth during the sensing or information related to a maximum bandwidth of a sensing signal may be included.

Sensing Frequency location: Information indicating a location to be measured (i.e., sensed) in relation to bandwidth. For example, information to perform sensing on primary 40 MHz among 80 MHz.

Type of Information: The type of information to be measured based on sounding frame reception (e.g., CSI per subcarrier). For example, information related to content to be included in the feedback frame may be included.

Signal Type: the type of Sounding frame (e.g., NDP, NDPA+NDP, New signal type). That is, when the sounding frame can be transmitted in several types, information on which type of sounding frame will be transmitted may be included.

Order of reports/sensing: In order to prevent collision during sounding or feedback, information related to the order of STAs may be explicitly included. Alternatively, the order in which information of the responder (STA) is implicitly indicated may be regarded as a sounding/feedback transmission order. For example, when the initiator transmits a sounding frame, order information of responders transmitting a feedback signal may be included, when responders transmit sounding frames, order information in which responders transmit sounding signals may be included.

RU/bandwidth information for Feedback: When feedback information needs to be received, RU (e.g., as in the trigger frame of 11ax)/bandwidth information to transmit feedback for each STA may be included.

Number of sounding: A sounding frame is not transmitted only once, but can be transmitted several times in a row. For example, a sensing initiation frame is transmitted once, a plurality of sounding frames are transmitted continuously, a feedback frame for a plurality of sounding frames may be transmitted. A sensing through transmission of a plurality of sounding frames can be performed, thus, information on how many times to transmit the sounding frame may also be included.

The sounding frame may be Null data packet (NDP), NDP announcement+NDP combination, etc., unlike the existing ones, a sensing frame specialized for sensing or a combination of sensing frame+NDP, etc. can be defined. Also, if a sensing frame specialized for the sensing is defined, the sensing frame may include information about a transmission signal (i.e., sensing frame). For example, the sensing frame may include the strength of a transmission signal, the number of antennas used for transmission, the number of spatial streams, a transmission technique applied to multi-antenna transmission, the number of transmissions, and the like.

A feedback frame may be transmitted as follows.

Time Division based: Transmit serially in order. At this time, each initiator may perform polling.

Figure 12:
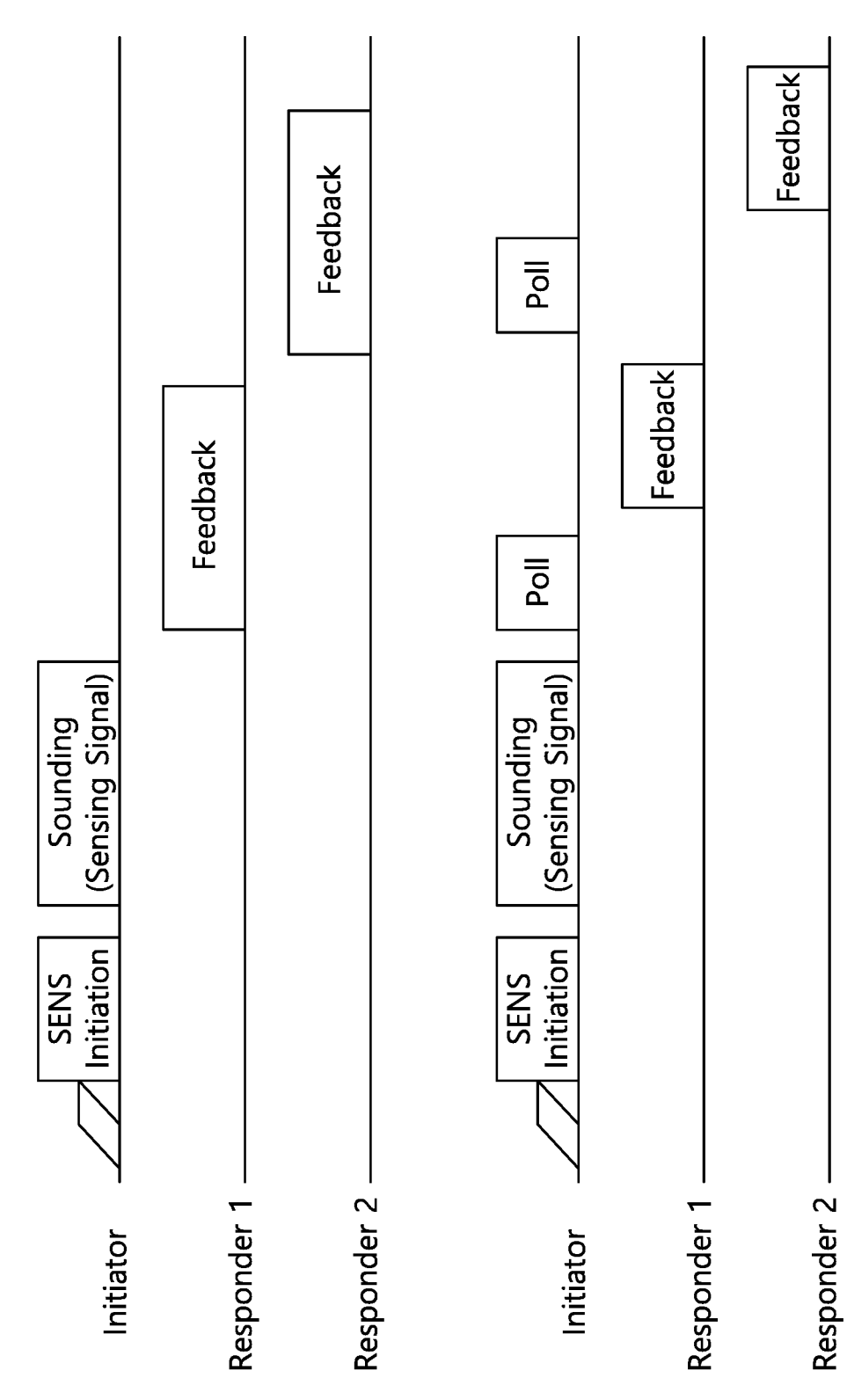
FIG. 12 is a diagram illustrating an embodiment of a method for transmitting a feedback frame.

FIG. 12 is a diagram illustrating an embodiment of a method for transmitting a feedback frame.

Referring to FIG. 12, the initiator may transmit a sensing initiation frame. The initiator may transmit a sounding frame after transmitting the sensing initiation frame. The responders (i.e., responders 1 and 2) may receive a sensing initiation frame and a sounding frame. The responders may transmit a feedback frame based on the received sounding frame.

For example, the feedback frame may be transmitted between responders in order. For example, the order of transmitting the feedback frame between responders may be included in the sensing initiation frame or may be preset. For example, after responder 1 transmits a feedback frame, responder 2 may transmit a feedback frame.

For example, the initiator may transmit a feedback polling frame to each responder after transmitting the sounding frame. That is, the initiator may transmit a frame requesting feedback to each responder, and the responder receiving the frame requesting feedback may transmit a feedback frame. For example, the initiator may transmit a polling frame to the responder 1 after transmitting a sensing initiation frame and a sounding frame. The responder 1 may transmit a feedback frame after receiving the polling frame. The initiator may transmit a polling frame to the responder 2 after receiving the feedback frame from the responder 1. The responder 2 may transmit a feedback frame after receiving the polling frame.

Frequency Division based: If OFDMA which is the same as OFDMA based on 11ax is supported, a feedback frame can be transmitted through triggering. This trigger information may be included in a sensing initiation frame.

Figure 13:
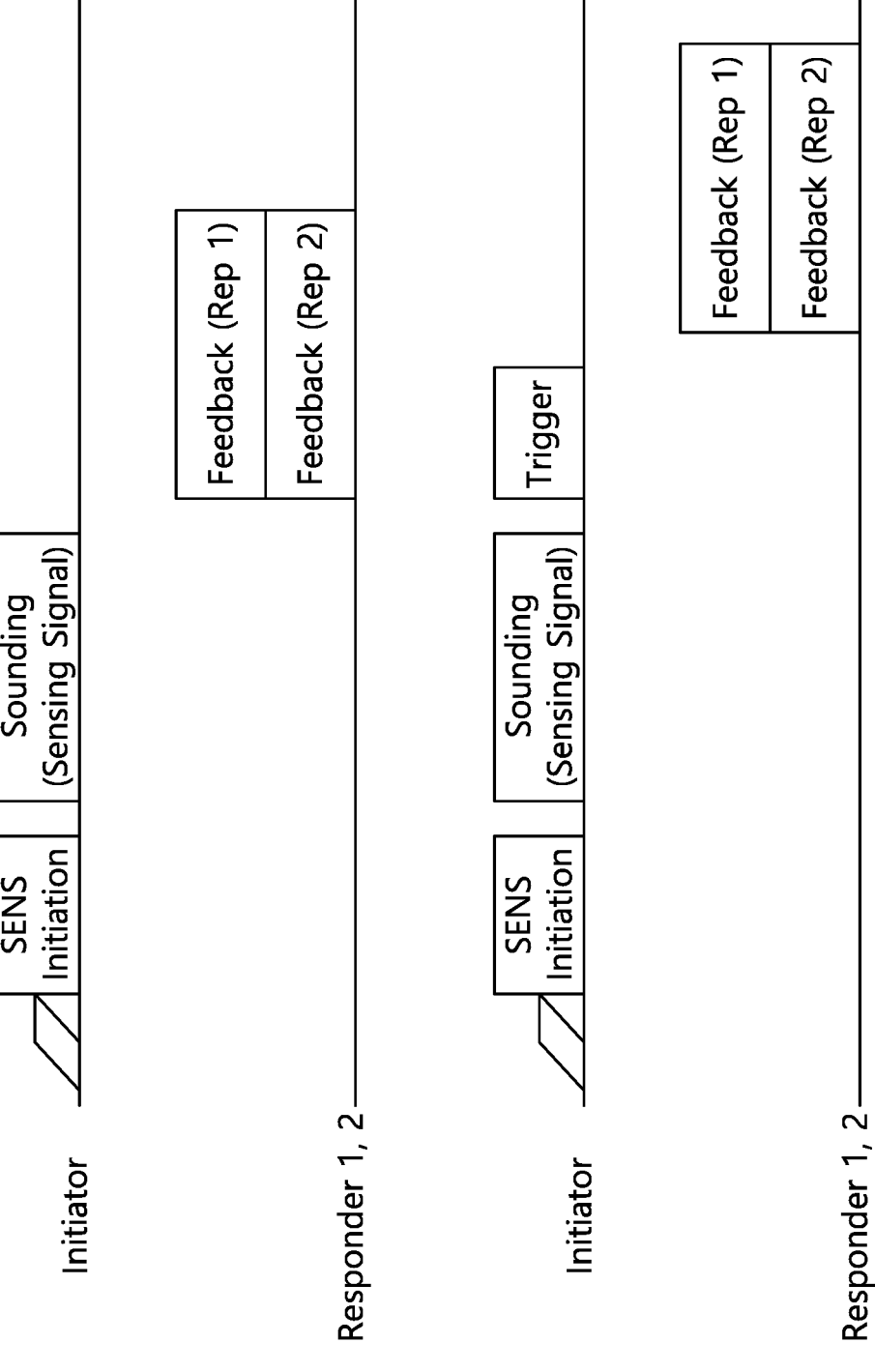
FIG. 13 is a diagram illustrating an embodiment of a method for transmitting a feedback frame.

FIG. 13 is a diagram illustrating an embodiment of a method for transmitting a feedback frame.

Referring to FIG. 13, the initiator may transmit a sensing initiation frame. The initiator may transmit a sounding frame after transmitting the sensing initiation frame. The responders (i.e., responders 1 and 2) may receive a sensing initiation frame and a sounding frame. The responders may transmit a feedback frame based on the received sounding frame.

For example, responders 1 and 2 may transmit a feedback frame at the same time. That is, the feedback frames transmitted by responders 1 and 2 may be transmitted in different frequency bands on the same time resource. For example, resource (e.g., RU) allocation information for feedback frames transmitted by responders 1 and 2 may be included in the sensing initiation frame.

For example, the initiator may transmit a trigger frame to responders 1 and 2 after transmitting the sounding frame. The trigger frame may include resource allocation information to which responders 1 and 2 will transmit a feedback frame. The responders 1 and 2 may transmit a feedback frame based on resource allocation information included in the trigger frame.

2. When the Sensing Responder Transmits a Sounding Frame

There may be a frame sequence as follows.

Figure 14:
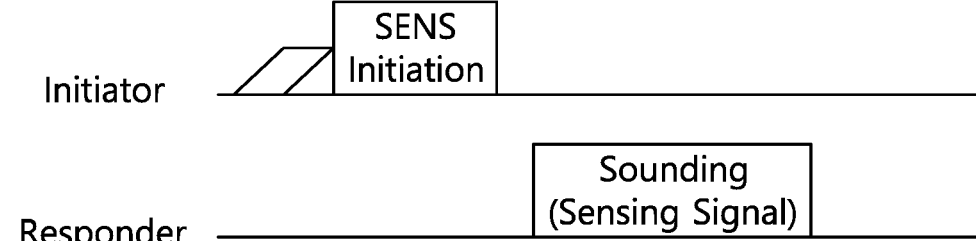
FIG. 14 is a diagram illustrating an embodiment of a method for a sensing responder to transmit a sounding frame.

FIG. 14 is a diagram illustrating an embodiment of a method for a sensing responder to transmit a sounding frame.

Referring to FIG. 14, the initiator may start a session through a sensing initiation frame, the responder may transmit a sounding frame based on the sensing initiation frame information. For example, if the initiator is an STA that needs to receive feedback, the responder may not transmit a feedback frame.

The Sensing Initiation frame may include the contents described above.

The sounding frame may be Null data packet (NDP), NDP announcement+NDP combination, etc., unlike the existing ones, a sensing frame specialized for sensing or a combination of sensing frame+NDP, etc. can be defined. Also, if a sensing frame specialized for the sensing is defined, the sensing frame may include information about a transmission signal (i.e., sensing frame). For example, the sensing frame may include the strength of a transmission signal, the number of antennas used for transmission, the number of spatial streams, a transmission technique applied to multi-antenna transmission, the number of transmissions, transmission bandwidth/RU, and the like.

Sounding frame can be transmitted as follows.

Time Division based: Transmit serially in order.

Figure 15:
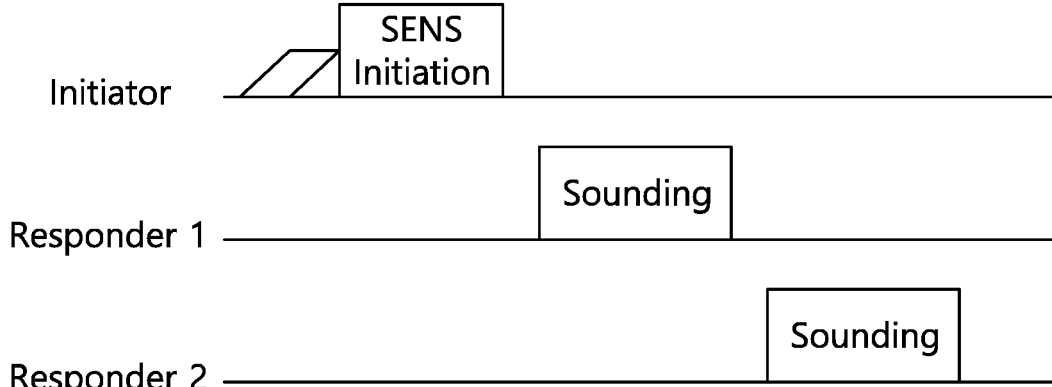
FIG. 15 is a diagram illustrating an embodiment of a method for transmitting a sounding frame.

FIG. 15 is a diagram illustrating an embodiment of a method for transmitting a sounding frame.

Referring to FIG. 15, the initiator may transmit a sensing initiation frame. Responders may transmit a sounding frame after receiving the sensing initiation frame. For example, responders may transmit the sounding frame to the initiator in order. For example, the sensing initiation frame may include information on the order in which responders transmit the sounding frame. For example, responder 1 may transmit a sounding frame first, and then responder 2 may transmit a sounding frame.

For example, when the initiator wants to acquire sensing information through a sounding frame, since the initiator can acquire sensing information by receiving and analyzing the sounding signal, the initiator may not transmit the feedback signal. That is, since the initiator has already acquired the feedback information, the initiator may not transmit it to responders.

Frequency Division based: If OFDMA same as OFDMA based on 11ax is supported, a feedback frame can be transmitted through triggering. This trigger information may be included in an initiation frame.

Figure 16:
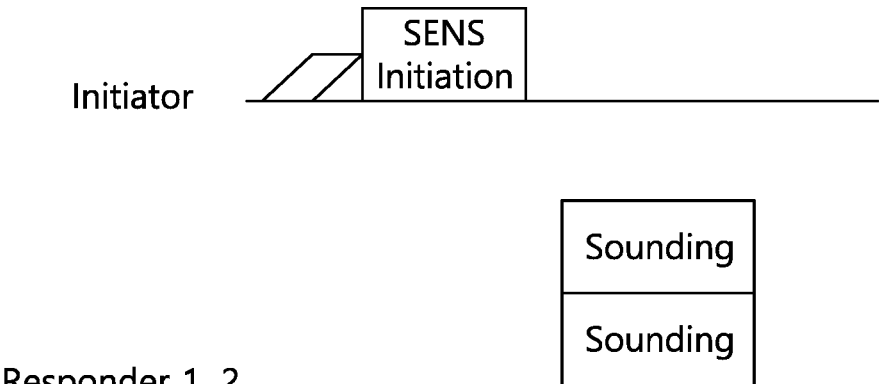
FIG. 16 is a diagram illustrating an embodiment of a method for transmitting a sounding frame.

FIG. 16 is a diagram illustrating an embodiment of a method for transmitting a sounding frame.

Referring to FIG. 16, the initiator may transmit a sensing initiation frame. Responders may transmit a sounding frame after receiving the sensing initiation frame. For example, responders may transmit a sounding frame to the initiator at the same time. That is, sounding frames transmitted by responders 1 and 2 may be transmitted in different frequency bands on the same time resource. For example, resource (e.g., RU) allocation information for the sounding frame transmitted by responders 1 and 2 may be included in the sensing initiation frame.

For example, when the initiator wants to acquire sensing information through a sounding frame, since the initiator can acquire sensing information by receiving and analyzing the sounding signal, the initiator may not transmit the feedback signal. That is, since the initiator has already acquired the feedback information, the initiator may not transmit it to responders.

Figure 17:
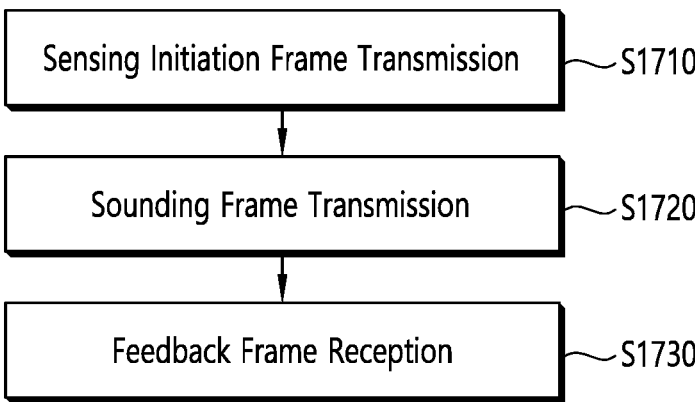
FIG. 17 is a diagram illustrating an embodiment of an operating method for a transmitting STA.

FIG. 17 is a diagram illustrating an embodiment of an operating method for a transmitting STA.

Referring to FIG. 17, an operation of a transmitting STA may be based on technical features described in at least one of FIGS. 1 to 16.

The transmitting STA may transmit a sensing initiation frame (S1710). For example, the transmitting STA may transmit a sensing initiation frame to the first receiving STA. For example, the sensing initiation frame may include a session identifier (ID) related to an STA group to perform sensing and information related to an STA transmitting a sounding frame.

For example, the sensing initiation frame may include information related to an STA that will transmit the sounding frame.

The transmitting STA may transmit a sounding frame (S1720). For example, the transmitting STA may transmit a sounding frame to the first receiving STA.

For example, the sounding frame may include a null data packet announcement (NDPA) frame and a null data packet (NDP) frame.

For example, the sensing session is a series of operations including transmission of the sensing initiation frame, the sounding frame, and the first feedback frame, the session ID may be used to identify the sensing session.

The transmitting STA may receive the feedback frame (S1730). For example, the transmitting STA may receive a first feedback frame for the sounding frame from the first receiving STA.

For example, the sounding frame may be a frame transmitted to identify a target, the first feedback frame may include information related to a channel changed by the target.

For example, the sensing initiation frame and the sounding frame may also be transmitted to a second receiving STA. The transmitting STA may receive a second feedback frame for the sounding frame from the second receiving STA. The first and second feedback frames may be transmitted through different frequency resources on the same time resource.

For example, the sensing initiation frame may further include resource allocation information for transmitting the first and second feedback frames.

The sensing initiation frame may have the following contents, but is not limited thereto.

Sounding frame transmitter: whether or not who will transmit the sounding frame. For example, an initiator or a responder may transmit a sounding frame. For example, information for classifying a mode in which an initiator transmits a sounding frame or a mode in which a responder transmits a sounding frame may be included. For example, only information about who transmits the sounding frame among the initiator and the responder may be included, not information related to the ID of the STA transmitting the sounding frame.

Responder (STA) information: information on STAs participating in sensing (e.g., STA ID, AID)

Group ID (GID) or Session ID: If there is a grouping for the sensing, it can be identified by transmitting the ID for this group. If only GIDs are included instead of multiple STA IDs, overhead can be reduced. Alternatively, a GID may exist for each sensing session. For example, a Session ID for a group performing sensing may be allocated for each sensing session.

Signal Length: Transmission time of the sensing signal (i.e., sounding frame). That is, length information of the sensing signal may be included.

Measurable Bandwidth: Available bandwidth for the sensing. For example, information related to a measurable bandwidth during the sensing or information related to a maximum bandwidth of a sensing signal may be included.

Sensing Frequency location: Information indicating a location to be measured (i.e., sensed) in relation to bandwidth. For example, information to perform sensing on primary 40 MHz among 80 MHz.

Type of Information: The type of information to be measured based on sounding frame reception (e.g., CSI per subcarrier). For example, information related to content to be included in the feedback frame may be included.

Signal Type: the type of Sounding frame (e.g., NDP, NDPA+NDP, New signal type). That is, when the sounding frame can be transmitted in several types, information on which type of sounding frame will be transmitted may be included.

Order of reports/sensing: In order to prevent collision during sounding or feedback, information related to the order of STAs may be explicitly included. Alternatively, the order in which information of the responder (STA) is implicitly indicated may be regarded as a sounding/feedback transmission order. For example, when the initiator transmits a sounding frame, order information of responders transmitting a feedback signal may be included, when responders transmit sounding frames, order information in which responders transmit sounding signals may be included.

RU/bandwidth information for Feedback: When feedback information needs to be received, RU (e.g., as in the trigger frame of 11ax)/bandwidth information to transmit feedback for each STA may be included.

Number of sounding: A sounding frame is not transmitted only once, but can be transmitted several times in a row. For example, a sensing initiation frame is transmitted once, a plurality of sounding frames are transmitted continuously, a feedback frame for a plurality of sounding frames may be transmitted. A sensing through transmission of a plurality of sounding frames can be performed, thus, information on how many times to transmit the sounding frame may also be included.

The sounding frame may be Null data packet (NDP), NDP announcement+NDP combination, etc., unlike the existing ones, a sensing frame specialized for sensing or a combination of sensing frame+NDP, etc. can be defined. Also, if a sensing frame specialized for the sensing is defined, the sensing frame may include information about a transmission signal (i.e., sensing frame). For example, the sensing frame may include the strength of a transmission signal, the number of antennas used for transmission, the number of spatial streams, a transmission technique applied to multi-antenna transmission, the number of transmissions, and the like.

A feedback frame may be transmitted as follows.

Time Division based: Transmit serially in order. At this time, each initiator may perform polling.

For example, the feedback frame may be transmitted between responders in order. For example, the order of transmitting the feedback frame between responders may be included in the sensing initiation frame or may be preset. For example, after responder 1 transmits a feedback frame, responder 2 may transmit a feedback frame.

For example, the initiator may transmit a feedback polling frame to each responder after transmitting the sounding frame. That is, the initiator may transmit a frame requesting feedback to each responder, and the responder receiving the frame requesting feedback may transmit a feedback frame. For example, the initiator may transmit a polling frame to the responder 1 after transmitting a sensing initiation frame and a sounding frame. The responder 1 may transmit a feedback frame after receiving the polling frame. The initiator may transmit a polling frame to the responder 2 after receiving the feedback frame from the responder 1. The responder 2 may transmit a feedback frame after receiving the polling frame.

Frequency Division based: If OFDMA same as OFDMA based on 11ax is supported, a feedback frame can be transmitted through triggering. This trigger information may be included in a sensing initiation frame.

For example, responders 1 and 2 may transmit a feedback frame at the same time. That is, the feedback frames transmitted by responders 1 and 2 may be transmitted in different frequency bands on the same time resource. For example, resource (e.g., RU) allocation information for feedback frames transmitted by responders 1 and 2 may be included in the sensing initiation frame.

For example, the initiator may transmit a trigger frame to responders 1 and 2 after transmitting the sounding frame. The trigger frame may include resource allocation information to which responders 1 and 2 will transmit a feedback frame. The responders 1 and 2 may transmit a feedback frame based on resource allocation information included in the trigger frame.

Figure 18:
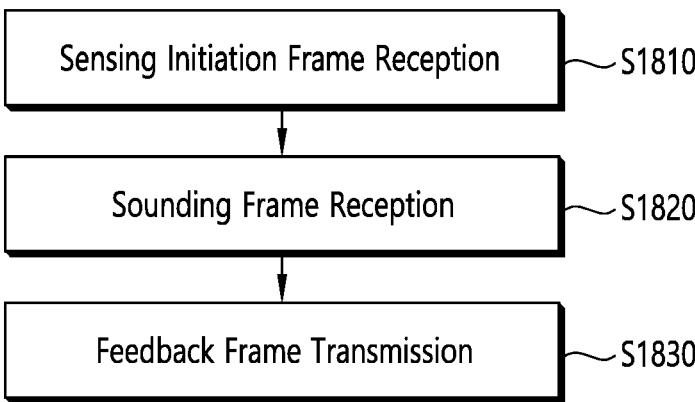
FIG. 18 is a diagram illustrating an embodiment of an operating method for a receiving STA.

FIG. 18 is a diagram illustrating an embodiment of an operating method for a receiving STA.

Referring to FIG. 18, an operation of a receiving STA may be based on technical features described in at least one of FIGS. 1 to 16.

The receiving STA may receive a sensing initiation frame (S1810). For example, the receiving STA may receive a sensing initiation frame from the transmitting STA. For example, the sensing initiation frame may include a session identifier (ID) related to an STA group to perform sensing and information related to an STA transmitting a sounding frame.

For example, the sensing initiation frame may include information related to an STA that will transmit the sounding frame.

The receiving STA may receive the sounding frame (S1820). For example, the receiving STA may transmit a sounding frame from the transmitting STA.

For example, the sounding frame may include a null data packet announcement (NDPA) frame and a null data packet (NDP) frame.

For example, the sensing session is a series of operations including transmission of the sensing initiation frame, the sounding frame, and the first feedback frame, the session ID may be used to identify the sensing session.

The receiving STA may transmit a feedback frame (S1830). For example, the receiving STA may receive the feedback frame for the sounding frame from the transmitting STA.

For example, the sounding frame may be a frame transmitted to identify a target, the feedback frame may include information related to a channel changed by the target.

The sensing initiation frame may have the following contents, but is not limited thereto.

Sounding frame transmitter: whether or not who will transmit the sounding frame. For example, an initiator or a responder may transmit a sounding frame. For example, information for classifying a mode in which an initiator transmits a sounding frame or a mode in which a responder transmits a sounding frame may be included. For example, only information about who transmits the sounding frame among the initiator and the responder may be included, not information related to the ID of the STA transmitting the sounding frame.

Responder (STA) information: information on STAs participating in sensing (e.g., STA ID, AID)

Group ID (GID) or Session ID: If there is a grouping for the sensing, it can be identified by transmitting the ID for this group. If only GIDs are included instead of multiple STA IDs, overhead can be reduced. Alternatively, a GID may exist for each sensing session. For example, a Session ID for a group performing sensing may be allocated for each sensing session.

Signal Length: Transmission time of the sensing signal (i.e., sounding frame). That is, length information of the sensing signal may be included.

Measurable Bandwidth: Available bandwidth for the sensing. For example, information related to a measurable bandwidth during the sensing or information related to a maximum bandwidth of a sensing signal may be included.

Sensing Frequency location: Information indicating a location to be measured (i.e., sensed) in relation to bandwidth. For example, information to perform sensing on primary 40 MHz among 80 MHz.

Type of Information: The type of information to be measured based on sounding frame reception (e.g., CSI per subcarrier). For example, information related to content to be included in the feedback frame may be included.

Signal Type: the type of Sounding frame (e.g., NDP, NDPA+NDP, New signal type). That is, when the sounding frame can be transmitted in several types, information on which type of sounding frame will be transmitted may be included.

Order of reports/sensing: In order to prevent collision during sounding or feedback, information related to the order of STAs may be explicitly included. Alternatively, the order in which information of the responder (STA) is implicitly indicated may be regarded as a sounding/feedback transmission order. For example, when the initiator transmits a sounding frame, order information of responders transmitting a feedback signal may be included, when responders transmit sounding frames, order information in which responders transmit sounding signals may be included.

RU/bandwidth information for Feedback: When feedback information needs to be received, RU (e.g., as in the trigger frame of 11ax)/bandwidth information to transmit feedback for each STA may be included.

Number of sounding: A sounding frame is not transmitted only once, but can be transmitted several times in a row. For example, a sensing initiation frame is transmitted once, a plurality of sounding frames are transmitted continuously, a feedback frame for a plurality of sounding frames may be transmitted. A sensing through transmission of a plurality of sounding frames can be performed, thus, information on how many times to transmit the sounding frame may also be included.

The sounding frame may be Null data packet (NDP), NDP announcement+NDP combination, etc., unlike the existing ones, a sensing frame specialized for sensing or a combination of sensing frame+NDP, etc. can be defined. Also, if a sensing frame specialized for the sensing is defined, the sensing frame may include information about a transmission signal (i.e., sensing frame). For example, the sensing frame may include the strength of a transmission signal, the number of antennas used for transmission, the number of spatial streams, a transmission technique applied to multi-antenna transmission, the number of transmissions, and the like.

A feedback frame may be transmitted as follows.

Time Division based: Transmit serially in order. At this time, each initiator may perform polling.

For example, the feedback frame may be transmitted between responders in order. For example, the order of transmitting the feedback frame between responders may be included in the sensing initiation frame or may be preset. For example, after responder 1 transmits a feedback frame, responder 2 may transmit a feedback frame.

For example, the initiator may transmit a feedback polling frame to each responder after transmitting the sounding frame. That is, the initiator may transmit a frame requesting feedback to each responder, and the responder receiving the frame requesting feedback may transmit a feedback frame. For example, the initiator may transmit a polling frame to the responder 1 after transmitting a sensing initiation frame and a sounding frame. The responder 1 may transmit a feedback frame after receiving the polling frame. The initiator may transmit a polling frame to the responder 2 after receiving the feedback frame from the responder 1. The responder 2 may transmit a feedback frame after receiving the polling frame.

Frequency Division based: If OFDMA same as OFDMA based on 11ax is supported, a feedback frame can be transmitted through triggering. This trigger information may be included in a sensing initiation frame.

For example, responders 1 and 2 may transmit a feedback frame at the same time. That is, the feedback frames transmitted by responders 1 and 2 may be transmitted in different frequency bands on the same time resource. For example, resource (e.g., RU) allocation information for feedback frames transmitted by responders 1 and 2 may be included in the sensing initiation frame.

For example, the initiator may transmit a trigger frame to responders 1 and 2 after transmitting the sounding frame. The trigger frame may include resource allocation information to which responders 1 and 2 will transmit a feedback frame. The responders 1 and 2 may transmit a feedback frame based on resource allocation information included in the trigger frame.

Some of the detailed steps shown in the example of FIGS. 17 and 18 may not be essential steps and may be omitted. In addition to the steps shown in FIGS. 17 and 18, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIG. 1 and/or FIG. 9. For example, the technical features of the present specification described above may be applied only to a part of FIGS. 1 and/or 9. For example, the technical features of the present specification described above may be implemented based on the processing chips 114 and 124 of FIG. 1, or may be implemented based on the processor 111, 121 and the memory 112, 122 of FIG. 1, or may be implemented based on the processor 910 and the memory 920 of FIG. 9. For example, in the apparatus of the present specification, the apparatus may include: a memory; and a processor operatively coupled with the memory, the processor may be adapted to transmit a sensing initiation frame to a first receiving STA, wherein the sensing initiation frame includes a session identifier (ID) related to a STA group to perform sensing and information related to an STA transmitting a sounding frame; transmit the sounding frame to the first receiving STA; and receive a first feedback frame for the sounding frame from the first receiving STA.

The technical features of the present specification may be implemented based on a CRM (computer readable medium). For example, the CRM proposed by the present specification, which is at least one computer-readable recording medium (computer readable medium) including instructions based on being executed by at least one processor of a transmitting STA (station) of a wireless local area network (Wireless Local Area Network) system. Based on that the instructions being executed by the at least one processor of the transmitting STA of the WLAN, the operations includes: transmitting a sensing initiation frame to a first receiving STA, wherein the sensing initiation frame includes a session identifier (ID) related to a STA group to perform sensing and information related to an STA transmitting a sounding frame; transmitting the sounding frame to the first receiving STA; and receiving a first feedback frame for the sounding frame from the first receiving STA.

The instructions stored in the CRM of the present specification may be executed by at least one processor. At least one processor related to CRM in the present specification may be the processors 111 and 121 or the processing chips 114 and 124 of FIG. 1, or the processor 910 of FIG. 9. Meanwhile, the CRM of the present specification may be the memories 112 and 122 of FIG. 1, the memory 920 of FIG. 9, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problemsolving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

transmitting, by a sensing initiator, a sensing frame to at least one sensing responder, wherein the sensing frame includes a sensing session identifier (ID) identifying a sensing session to perform sensing, wherein the sensing frame further includes responder information identifying the at least one sensing responder and initiator information identifying the sensing initiator, wherein the sensing frame further includes type information related to a sounding frame which follows the sensing frame, wherein the type information has a first value based on the sensing frame being followed by a null data physical protocol data unit (NDP) frame transmitted by the sensing initiator, wherein the type information has a second value based on the sensing frame being followed by an NDP announcement (NDPA) frame transmitted by the sensing initiator, and the NDPA frame is followed by a null data physical protocol data unit (NDP) frame transmitted by the sensing initiator;

transmitting, by the sensing initiator, the sounding frame based on the sensing frame, wherein a type of the sounding frame is determined based on the sensing frame type information; and receiving, by the sensing initiator, a feedback frame based on the sounding frame.

2. The method of claim 1, wherein the sensing frame further includes resource allocation information for transmitting the feedback frame.

3. A sensing initiator in a wireless local area network (WLAN) system, comprising:

a transceiver for transmitting and receiving a radio signal; and a processor coupled to the transceiver, the processor is adapted to perform:

transmit a sensing frame to at least one sensing responder, wherein the sensing frame includes a sensing session identifier (ID) identifying a sensing session to perform sensing, wherein the sensing frame further includes responder information identifying the at least one sensing responder and initiator information identifying the sensing initiator, wherein the sensing frame further includes type information related to a sounding frame which follows the sensing frame, wherein the type information has a first value based on the sensing frame being followed by a null data physical protocol data unit (NDP) frame transmitted by the sensing initiator, wherein the type information has a second value based on the sensing frame being followed by an NDP announcement (NDPA) frame transmitted by the sensing initiator, and the NDPA frame is followed by a null data physical protocol data unit (NDP) frame transmitted by the sensing initiator;

transmit the sounding frame based on the sensing frame, wherein a type of the sounding frame is determined based on the sensing frame type information; and receive a feedback frame based on the sounding frame.

4. The sensing initiator of claim 3, wherein the sensing initiation frame further includes resource allocation information for transmitting the feedback frame.

* * * * *